United States Patent
De Domenico et al.

(10) Patent No.: US 11,412,404 B2
(45) Date of Patent: Aug. 9, 2022

(54) METHOD FOR OPTIMIZING THE QUALITY OF NETWORK RESOURCES AND THE NUMBER OF SERVICES LIKELY TO USE SAID RESOURCES

(71) Applicant: COMMISSARIAT A L'ENERGIE ATOMIQUE ET AUX ENERGIES ALTERNATIVES, Paris (FR)

(72) Inventors: Antonio De Domenico, Grenoble (FR); Ghina Dandachi, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/064,761

(22) Filed: Oct. 7, 2020

(65) Prior Publication Data

US 2021/0153069 A1 May 20, 2021

(30) Foreign Application Priority Data

Oct. 10, 2019 (FR) .................................... 19 11263

(51) Int. Cl.
*H04W 28/02* (2009.01)
*H04W 4/50* (2018.01)
(Continued)

(52) U.S. Cl.
CPC ......... *H04W 28/0268* (2013.01); *H04W 4/50* (2018.02); *H04W 28/24* (2013.01); *H04W 48/06* (2013.01)

(58) Field of Classification Search
CPC ... H04W 28/0268; H04W 4/50; H04W 28/24; H04W 48/06
See application file for complete search history.

(56) References Cited

U.S. PATENT DOCUMENTS

2017/0141973 A1 5/2017 Vrzic
2017/0142591 A1 5/2017 Vrzic
(Continued)

FOREIGN PATENT DOCUMENTS

JP 2018-207190 A 12/2018

OTHER PUBLICATIONS

French Preliminary Search Report dated Jun. 8, 2020 in French Application 19 11263 filed on Oct. 10, 2019 (with English Translation of Categories of Cited Documents), citing documents AA-AE & AO therein, 3 pages.
(Continued)

*Primary Examiner* — Ajay Cattungal
(74) *Attorney, Agent, or Firm* — Oblon, McClelland, Maier & Neustadt, L.L.P.

(57) ABSTRACT

The invention relates to a method for optimizing the quantity of network resources and the number of services likely to use said resources in a virtualized telecommunications network comprising the following steps of:
- evaluating similarities between the services likely to use said resources in terms of the virtual network functions VNFs required for the instantiation of each service,
- gathering services as a function of their similarities in order to maximize resource sharing,
- calculating additional resources to accept services awaiting instantiation;
- running an admission control scheme to accept or reject requests for the instantiation of new services.

13 Claims, 5 Drawing Sheets

(51) Int. Cl.
*H04W 28/24* (2009.01)
*H04W 48/06* (2009.01)

(56) References Cited

U.S. PATENT DOCUMENTS

| | | | |
|---|---|---|---|
| 2018/0317133 A1* | 11/2018 | Sciancalepore | H04W 24/02 |
| 2018/0317134 A1 | 11/2018 | Leroux et al. | |
| 2018/0332485 A1* | 11/2018 | Senarath | H04W 28/24 |
| 2019/0123963 A1* | 4/2019 | Tang | H04W 4/70 |
| 2019/0174320 A1 | 6/2019 | Kodaypak et al. | |
| 2019/0364431 A1 | 11/2019 | Kodaypak et al. | |
| 2020/0379793 A1* | 12/2020 | Parihar | G06F 9/45558 |
| 2020/0412612 A1* | 12/2020 | Cherunni | H04L 41/0896 |

OTHER PUBLICATIONS

U.S. Appl. No. 16/681,973, filed Nov. 13, 2019, 2020/0162930 A1, Miscopein, B, et al.

* cited by examiner

METHOD FOR OPTIMIZING THE QUALITY OF NETWORK RESOURCES AND THE NUMBER OF SERVICES LIKELY TO USE SAID RESOURCES

TECHNICAL FIELD

The invention is in the field of virtualized telecommunication networks and more specifically relates to a method for optimizing the quantity of network resources and the number of services likely to use said resources.

The invention also relates to a computer program stored on a recording medium and containing instructions for implementing the method when run on a computer.

STATE OF PRIOR ART

Over the last decade, the technological revolution that characterizes mobile telephone networks has changed the way we communicate and led to new applications and services, which will characterize the communication systems fifth generation (5G) and subsequent developments.

These new applications and services are gathered into three case of use classes, each characterized by specific requirements and Key Performance Indicators (KPIs):
  Ultra-reliable, low-latency communications (URLLC),
  Massive machine-type communications (mMTC),
  Enhanced Mobile Broadband (eMBB).

FIG. 1 illustrates the correspondence between these cases of use and requirements associated therewith. To effectively support cases of use and applications with heterogeneous requirements, 5G and later communication systems will instantiate a new and flexible architecture in which the network infrastructure is logically divided into different instances, i.e. network slices, each designed for a specific service running in the cloud environment. A network slice consists of Physical Network Functions (PNF) and Virtual Network Functions (VNF). A VNF represents the software implementation, i.e. operating in a cloud environment, of traditional functions such as routing or packet scheduling. The network slice concept is schematically illustrated in FIG. 2. The main standardization body for network slicing is the 3GPP (Third Generation Partnership Project). Its specifications detail the network functionalities and their sequencing to provide these slices on the Radio Access Network (RAN) and the Core Network (CN) [3GPPTS28.531].

In addition to designing the access and core functions, one of the most difficult tasks is to transition from a fixed-capacity OSS (Operating Support System) and BSS (Business Support System) system to a new hierarchy of elements that have to deal with a very complex ecosystem, both from the point of view of network users, network slices, and services that generally have different throughput and QoS requirements.

In addition to management, future 5G and subsequent networks will require orchestration capabilities, which are divided into two main categories, service orchestration and resource orchestration. Tasks such as sharing a VNF between network slices, their location in a highly heterogeneous cloud infrastructure or the number of allocated core processors are just a few examples of the responsibilities of the M&O, Management and Orchestration, function.

Functions related to the lifecycle management of virtual network functions VNFs and the orchestration of their resources go beyond the responsibility of the 3GPP group. The standardization body in charge of defining these functions is the European Telecommunications Standards Institute (ETSI), more precisely the Network Function Standardization Group (NFV) [ETSIGR].

FIG. 3 shows the correspondence between 3GPP network slices and concepts introduced by ETSI NFV. A network slice is seen from ETSI's point of view as a network service. FIG. 4 illustrates the correspondence between network slices and required network functions. A network function can be dedicated to a specific slice or shared between several slices. FIG. 5 schematically illustrates shared network functions and dedicated network functions within a network slice.

According to the 3GPP group, a network slice is a logic network that extends over the Radio access network RAN and the core network CN. To manage each domain, the 3GPP group suggests to break down a slice into RAN and CN slice subnets and defines the Network Slice Management Function (NSMF) and the Network Slice Subnet Management Function (NSSMF). The NSMF is the entity responsible for managing a slice across multiple domains and the NSSMF is the entity responsible for managing slice subnets in a specific domain [3GPPTS28.531]. A slice subnet comprises radio and core network functionalities configured to provide particular behaviour and meet specific requirements. To create and manage a slice, the NSMF (and NSSMFs) use a set of predefined descriptors or a template. Each descriptor, called Network Slice Template (NST), provides a description of the functionalities and their specific configuration (for example, operating frequency bands). In particular, it describes the list of NFV components that have to be instantiated to configure a network slice instance, as well as other information, such as configurations, life cycle steps, actions, monitoring, rules, service level agreements, etc.

However, these standardization frameworks only define guidelines on architectural aspects (interfaces and requirements) and design principles without providing specific solutions for the configuration and management of network slices, such as the allocation of the necessary resources by the VNF, priority or quality of service management. Consequently, it is necessary to create new schemes and frameworks capable of managing network resources related to radio, transport and cloud domains. In addition, it is necessary to take into account the fact that different slice requests may have different priorities and requirements and therefore the network resources have to be managed to ensure cross resource orchestration and management.

The purpose of the invention is to optimize the management and orchestration of networks by avoiding both under-provisioning and over-dimensioning of resources, which are the main causes of service outages and excessive expenses respectively for mobile communication service providers.

DISCLOSURE OF THE INVENTION

The invention is implemented by means of a cellular network management and orchestration system configured to receive service instantiation requests and to decide which network slices can be instantiated/accepted to implement these services according to their types/priorities, resource needs, the presence of other simultaneous requests and available network capacities (which depend on the network slices already instantiated).

The objective of the invention is therefore to increase the efficiency of the network, i.e. to increase the number of services instantiated using a given set of network resources, or equivalently, to limit the quantity of resources required to meet the requirements of a given set of services. This objective is achieved by means of a method for optimizing the quantity of network resources and the number of services likely to use said resources in a telecommunications network, comprising the following steps of:
- evaluating similarities between the services likely to use said resources in terms of the virtual network functions VNFs required for the instantiation of each service,
- group services into network slices according to their similarities in order to maximize resource sharing,
- calculating additional resources to accept services awaiting instantiation,
- running an admission control scheme to accept or reject requests for the instantiation of new services.

By identifying and gathering services with common needs into network slices, instead of creating a new slice for each requested service, the method according to the invention makes it possible to reduce the resources consumed globally so as to use, if necessary, a single slice to support services thus identified. In this way, the method according to the invention also makes it possible to reduce the time required to instantiate a new network service.

According to the invention, each service is instantiated in a logic network slice (NSI) comprising at least two sets of virtual network functions, i.e. a set of network functions $K^R$ which correspond to the radio access network RAN and a set of network functions $K^C$ which correspond to the core network.

The method according to the invention further comprises the steps of:
- defining a set $\mathcal{K} = \mathcal{K}^R \cup \mathcal{K}^C = \{NF_1, \ldots, NF_K\}$ representing all the network functions $K=(K_R+K_C)$ likely to be instantiated in the telecommunications network, and,
- for a given logical service n awaiting instantiation, defining a list $D_n$ containing the network functions required for the instantiation of this service and a description of the interactions between said network functions and parameters describing their respective configurations,
- defining a set of instantiated network slices comprising network functions shared between at least two network services and network functions specifically dedicated to a network service,
- comparing the network functions required by a network service awaiting instantiation with those of all the NSIs likely to serve the service awaiting instantiation with a minimum of additional network resources,
- evaluating the similarities between the network functions being compared, and,
- based on the similarities evaluated, selecting the NSI that shares the greatest number of network functions with the service awaiting instantiation,
- if no NSI shares network functions with the service awaiting instantiation, creating a new NSI, consisting exclusively of network functions specifically dedicated to the service awaiting instantiation.

In addition, for each service awaiting instantiation, $n \in \mathcal{N} = \{0,1, \ldots, N\}$, where N is an integer $N \geq 0$, is defined a subset $D_n$ of the set $\mathcal{K} = \mathcal{K}^R \cup \mathcal{K}^C = \{NF_1, \ldots, NF_K\}$ containing the network functions required for its instantiation and a set of configuration parameters $\mathcal{L}_{n,k}$ for each network function, and, to indicate the network functions that make up the nth request $D_n$, the vector $\lambda_n \in \{0,1\}^K$ is defined, whose k-th input is defined by:

$$\lambda_{n,k} = \begin{cases} 1, & \text{if } NF_k \in \mathcal{D}_n \\ 0, & \text{else} \end{cases}, \forall NF_k \in \mathcal{K}.$$

Then, for each network function $NF_k$ belonging to $D_n$, the configuration parameters associated therewith are represented as a set of J binary vectors as follows:

$$\mathcal{L}_{n,k} = \{l_{n,k,1}, l_{n,k,2}, \ldots, l_{n,k,J}\}.$$

Then the configuration parameters are mapped with a parameter $d_{n,k,r}$ representing the quantity of communication resources, a parameter $d_{n,k,c}$ representing the computing resources of the calculation, and a parameter $d_{n,k,m}$ representing the cloud storage capacity required by the network function $NF_k$ of the n-th service instantiation request using a template consisting of a static and a dynamic part:

$$d_{n,k,r} = \rho_k + f_{k,r}(\mathcal{L}_{n,k}),$$

$$d_{n,k,c} = \chi_k + f_{k,c}(\mathcal{L}_{n,k}),$$

$$d_{n,k,m} = \mu_k + f_{k,m}(\mathcal{L}_{n,k}),$$

where $\rho_k$, $\chi_k$ and $\mu_k$ represent the minimum quantity of resources required to activate a given network function $NF_k \in D_n$, and $f_{k,r}(\mathcal{L}_{n,k})$, $f_{k,c}(\mathcal{L}_{n,k})$ and $f_{k,m}(\mathcal{L}_{n,k})$ representing the additional quantity of resources required, which depends on the configuration parameters $\mathcal{L}_{n,k}$ of the network function $NF_k$, and the total request for communication resources, computing resources and cloud storage resources for said n-th request is calculated by the following formula:

$$T_n = (d_{n,r}, d_{n,c}, d_{n,m}),$$

where $d_{n,r} = \Sigma_{NF_k \in \mathcal{D}_n} d_{n,k,r}$, $d_{n,c} = \Sigma_{NF_k \in \mathcal{D}_n} d_{n,k,c}$ and $d_{n,m} = \Sigma_{NF_k \in \mathcal{D}_n} d_{n,k,m}$.

Evaluation of similarities between the network functions required by a network slice awaiting instantiation and those of the set of NSIs $\mathcal{B}$ already instantiated is obtained by calculating a Jaccard similarity parameter by the following formula:

$$\Lambda_{i,n} = \frac{\lambda_n \lambda_i}{\|\lambda_n\| + \|\lambda_i\| - \lambda_n \lambda_i}, i \in \mathcal{B},$$

where $\lambda_i$ indicates the network functions that make up the NSI $i \in \mathcal{B}$ already instantiated, and $\|\bullet\|$ representing a Euclidean norm operator.

If none of the NSIs already instantiated is adapted to the service awaiting instantiation, a new NSI is defined.

On the basis of the similarities calculated, the already instantiated NSI $i^* \in \mathcal{B}$ is selected, which shares the largest number of network functions VNFs with the network service awaiting instantiation n:

$$i^* = \underset{i \subset \mathcal{B}}{\mathrm{argmax}}\, \Lambda_{i,n}.$$

Then, n is temporarily added to the list of services related to NSI $i^*$.

According to the invention, for each pair of network services n, $n' \in R_{i^*,k}$, where $R_{i^*,k}$ represents all the services included in the NSI $i^* \in \mathcal{B}$ which require the network function $NF_k \in \mathcal{D}_n$, the similarity between a first set of configuration parameters $\mathcal{L}_{n,k}$ and a second set of configuration parameters $\mathcal{L}_{n',k}$ is defined as follows:

$$C(\mathcal{L}_{n,k}, \mathcal{L}_{n',k}) = \sum_{j=1}^{J} h(l_{n,k,j}, l_{n',k,j}),$$

where J is the number of parameters of the network function $NF_k$, and $h(\bullet)$ is the cosine similarity function (or cosine metric) which allows calculation of the similarity between two N-dimensional vectors by determining the cosine of the angle between them:

$$h(l_{n,k,j}, l_{n',k,j}) = \frac{l_{n,k,j} l_{n',k,j}}{\|l_{n,k,j}\| \|l_{n',k,j}\|}.$$

And, for each network function $NF_k \in \mathcal{D}_n$ of the service n, the quantity of resources that can be pooled between the different network services instantiated in the NSI i* and the new service n through the parameter $\sigma^*_{n,k,j}$ is evaluated as follows:

$$\sigma^*_{n,k,j} = \max_{n' \neq n \in \mathcal{R}_{i,k}} C(\mathcal{L}_{n,k}, \mathcal{L}_{n',k}), i \in \mathcal{B},$$

where the index j represents either communication resources, computing resources or storage resources.

According to another characteristic of the invention, the resources required to instantiate each function of the service n are calculated via the NSI i* using a template consisting of a static and a dynamic part:

$$d'_{n,k,r} = \rho_k \beta(\sigma^*_{n,k,j}) + (1-\sigma^*_{n,k,j}) f_{k,r}(\mathcal{L}_{n,k}),$$

$$d'_{n,k,c} = \chi_k \beta(\sigma^*_{n,k,j}) + (1-\sigma^*_{n,k,j}) f_{k,c}(\mathcal{L}_{n,k}),$$

$$d'_{n,k,m} = \mu_k \beta(\sigma^*_{n,k,j}) + (1-\sigma^*_{n,k,j}) f_{k,m}(\mathcal{L}_{n,k}),$$

where $\beta(x)$ is the characteristic function, which is equal to 1 if x=0 and is equal to 0 if x≠0 and, the total request for communication resources, computing resources and cloud storage resources for said nth service instantiation request is calculated as follows:

$$T'_n = (d'_{n,r}, d'_{n,c}, d'_{n,m}),$$

where $d'_{n,r} = \Sigma_{NF_k \in \mathcal{D}_n} d'_{n,k,r}$, $d'_{n,c} = \Sigma_{NF_k \in \mathcal{D}_n} d'_{n,k,c}$ and $d'_{n,m} = \Sigma_{NF_k \in \mathcal{D}_n} d'_{n,k,m}$.

In one embodiment of the invention, the services previously instantiated in the set of NSIs are periodically re-classified using a normalized spectral classification algorithm, the services being represented as nodes of a connected graph and clusters are found by partitioning this graph according to their spectral decomposition into sub-graphs.

In addition, the set $\mathcal{R} = \{1, N_R\}$ of services already instantiated with NF requests $\{\lambda_1, \ldots, \lambda_{N_R}\}$ is defined and an affinity matrix $\mathcal{A}$ which has the element $\mathcal{A}_{n,n'}$ describes the Jaccard similarity between two already instantiated services $n,n' \in \mathcal{R}$ is periodically calculated as follows:

$$\mathcal{A}_{n,n'} = \begin{cases} \Lambda_{n,n'}, & n \neq n' \\ 0, & \text{else} \end{cases},$$

Where $\Delta_{n,n'}$ is calculated by $$\Lambda_{i,n} = \frac{\lambda_n \lambda_i}{\|\lambda_n\| + \|\lambda_i\| - \lambda_n \lambda_i}, i \in \mathcal{B}.$$

Then from $\mathcal{A}$ are deduced the corresponding diagonal matrix S whose element (n, n) is the sum of the n-th row of A, $s_{n,n} = \Sigma_{n' \in \mathcal{R} \setminus n} \Delta_{n,n'}$, and the associated normalized Laplacian matrix as:

$$\mathcal{L} = S^{-\frac{1}{2}} \mathcal{A} S^{-\frac{1}{2}},$$

Then the normalized eigenvectors of $\mathcal{L}$ are calculated and the first k eigenvectors are gathered using K-means, the number of clusters k is obtained such that all eigenvalues $(1, \ldots, k)$ are very small, but the (k+1)-th is relatively large.

According to the invention, requests for the instantiation of new network services are ordered as a function of:
  their waiting time in a queue and then, from the oldest one, requests that can be fulfilled according to their request for resources are admitted; or
  the average quantity of resources requested, then it is checked which requests can be fulfilled, starting from the request characterized by the smallest request for network resources.

BRIEF DESCRIPTION OF THE DRAWINGS

Further characteristics and advantages of the invention will appear from the following description, taken as a non-limiting example, with reference to the appended figures in which.

DETAILED DISCLOSURE OF SPECIFIC EMBODIMENTS

The method according to the invention will be described within the scope of a cellular network management and orchestration system configured to receive service instantiation requests and to decide to accept or refuse these services according to their types/priorities, resource requirements, the presence of other simultaneous requests and available network capacities (which depend on the network slices already instantiated).

For the sake of clarity, in the following description, the instantiation of a network slice will mean the instantiation of the applications and services likely to be provided in that slice.

It should be remembered that each service is instantiated in a logic network slice comprising at least two sets of virtual network functions (VNF), i.e. a set of network functions $K^R$ which correspond to the radio access network RAN and a set of network functions $K^C$ corresponding to the core network.

Figure 1:
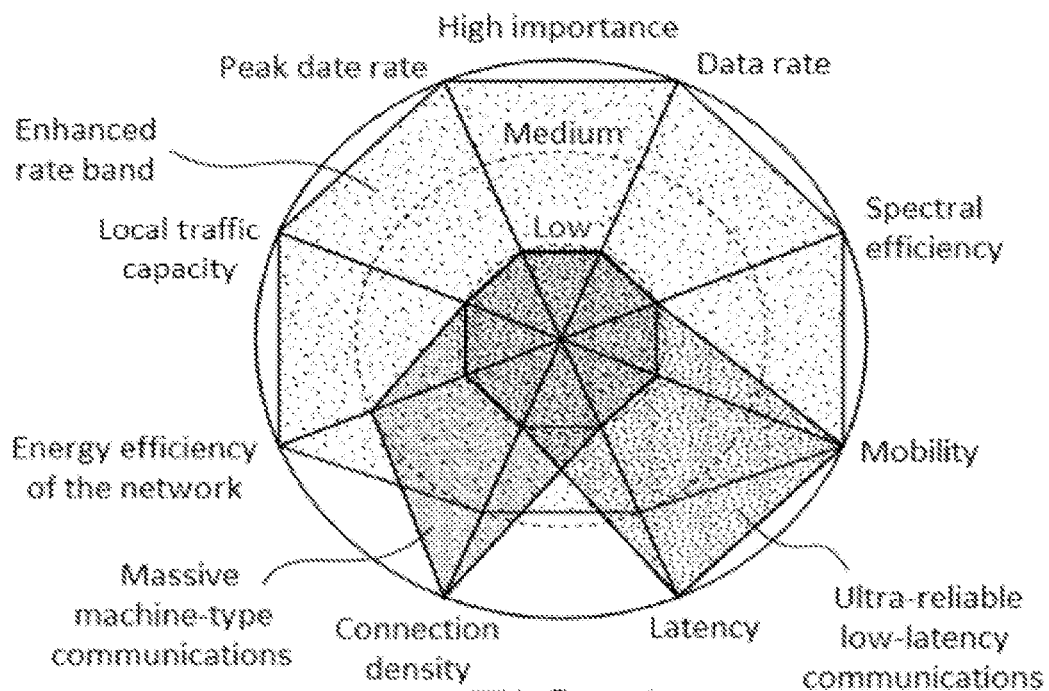
FIG. 1 illustrates the correspondence between new applications and services and the requirements associated with these new applications and services in 5G communication systems, FIG. 2 schematically illustrates the network slice concept.
Figure 2:
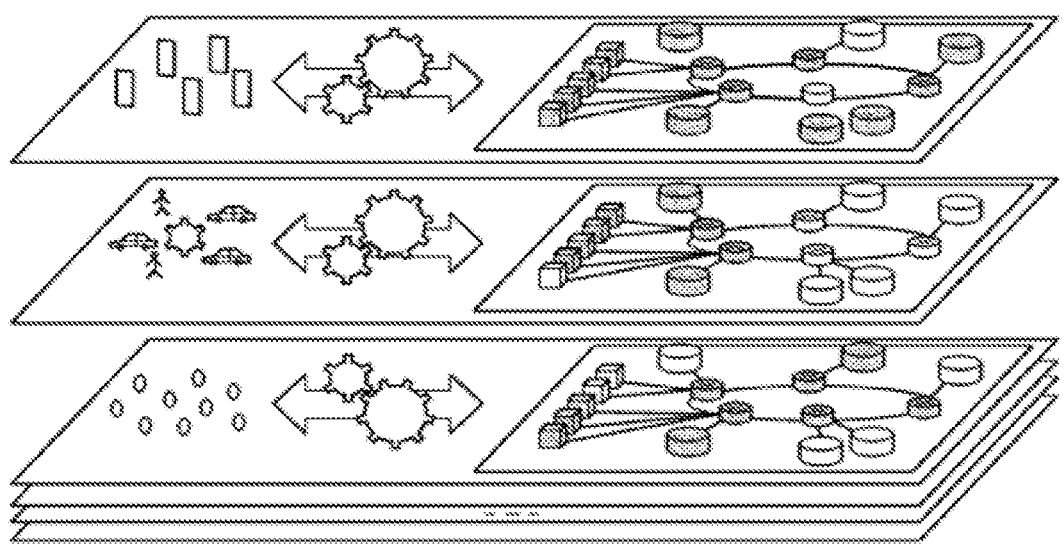
Figure 3:
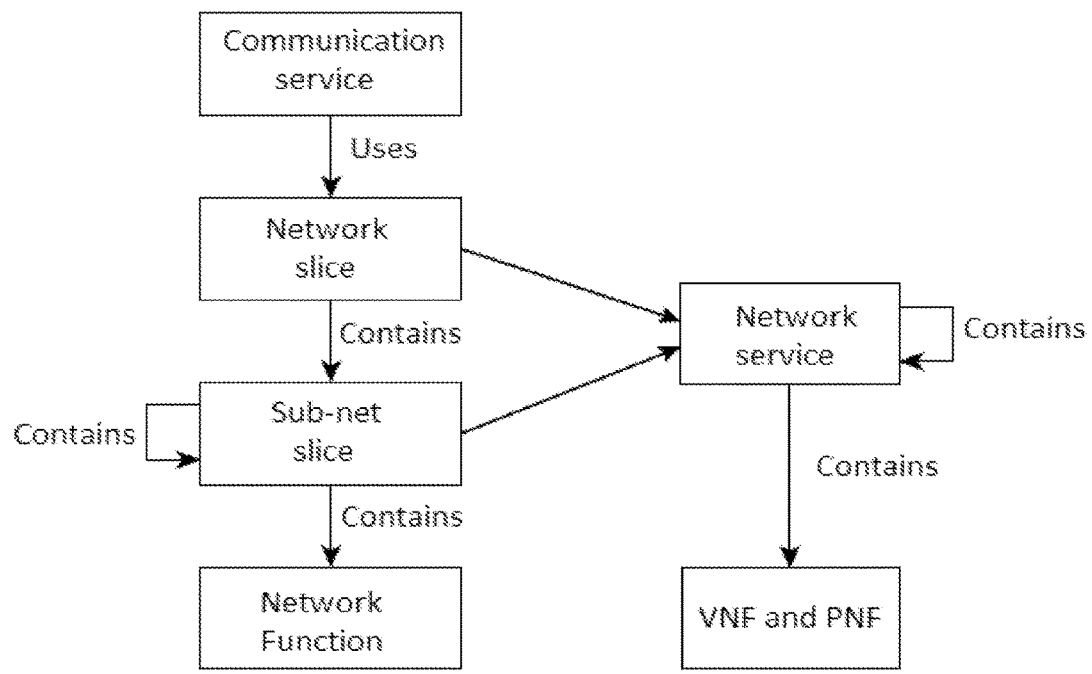
FIG. 3 illustrates the correspondence between 3GPP network slices and the concepts of ETSI NFV (European Telecommunication Standard Institute, Network Functions Virtualization)
Figure 4:
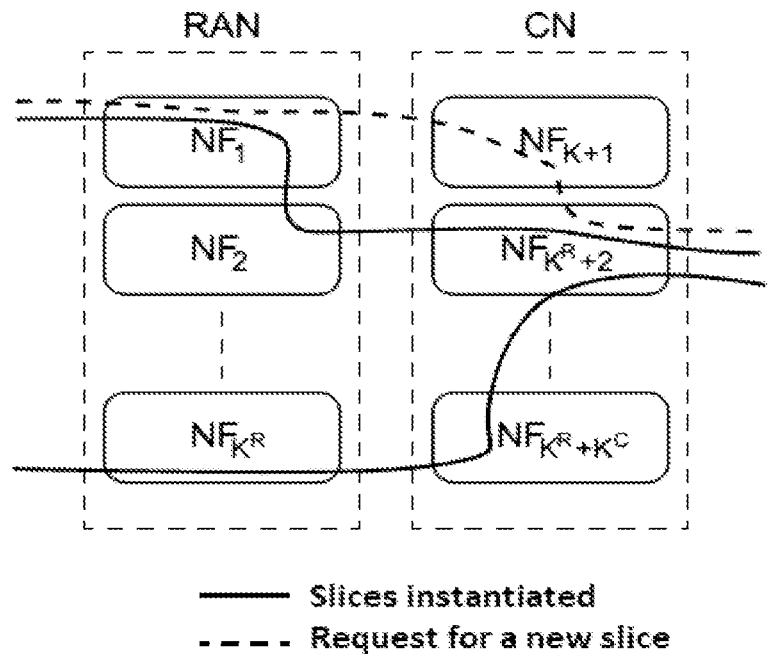
FIG. 4 shows the correspondence of network services with the required network functions.
Figure 5:
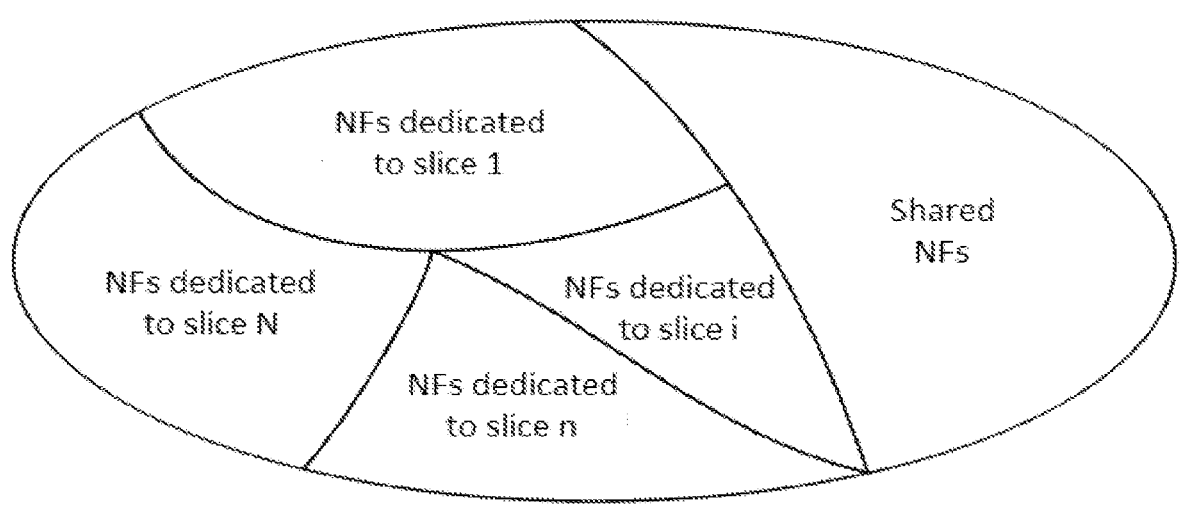
FIG. 5 represents an illustration of shared network functions and dedicated network functions in a network slice instance (NSI) that enables the simultaneous implementation of multiple services.
Figure 6:
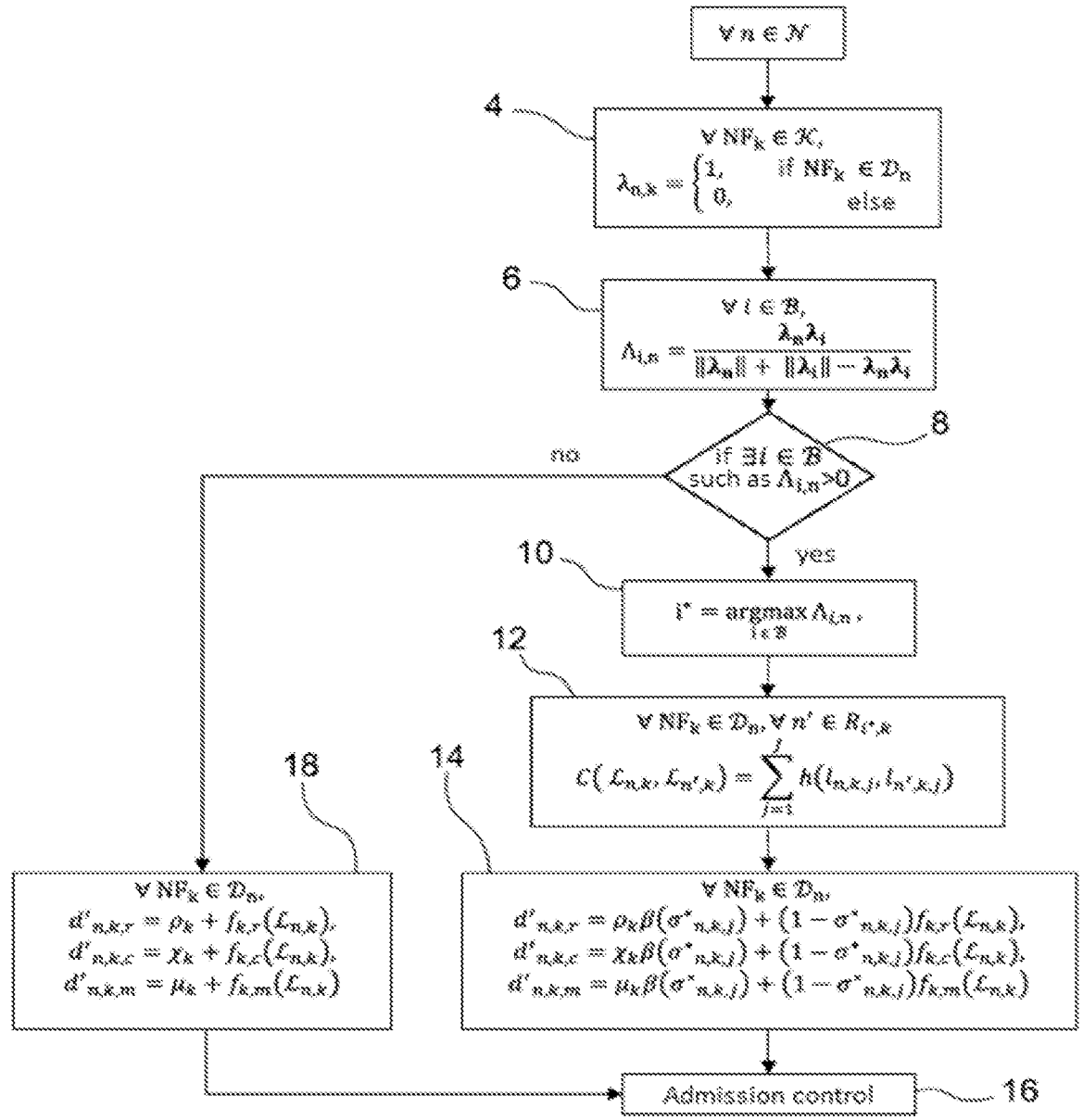
FIG. 6 represents a first flowchart illustrating essential steps of the method according to the invention.

The implementation of the method according to the invention will be described in reference to FIG. 6. Beforehand, a set of VNFs $\mathcal{K} = \mathcal{K}^R \cup \mathcal{K}^C = \{NF_1, \ldots, NF_K\}$ representing all the network functions $K=(K^R+K^C)$ likely to be instantiated in the telecommunications network is defined, and, for a given network service, a subset $D_n$ of the set $\mathcal{K}$ containing the network functions VNFs required for its instantiation and a description of the interactions between said network functions and parameters describing their respective configurations are defined. Then, to indicate the network functions VNFs required for the instantiation of the service $n \in \mathcal{N}$, in step 4 is introduced the vector $\lambda_n \in \{0,1\}^K$, the k-th input of which is defined by:

$$\lambda_{n,k} = \begin{cases} 1, & \text{if } NF_k \in \mathcal{D}_n \\ 0, & \text{else} \end{cases}, \forall NF_k \in \mathcal{K}.$$

The set $\mathcal{B}$ of NSIs instantiated is then defined, and, for each element of this set $i \in \mathcal{B}$, the subset of the set $\mathcal{K}$ containing the network functions VNFs instantiated for the NSI i. As for each network service, for each NSI $i \in \mathcal{B}$, the vector $\lambda_i$ is defined to indicate the available network functions VNFs.

A Jaccard similarity parameter is then calculated in step 6 to perform evaluation of the similarities between the network functions required by a service awaiting instantiation. n with those of all NSIs $\mathcal{B}$ already instantiated.

The Jaccard similarity parameter is defined by the following formula:

$$\Lambda_{i,n} = \frac{\lambda_n \lambda_i}{\|\lambda_n\| + \|\lambda_i\| - \lambda_n \lambda_i}, i \in \mathcal{B}.$$

In step 8, it is checked whether there is $i \in \mathcal{B}$, such that $\Lambda_{i,n} > 0$.

If yes, on the basis of the similarities calculated, in step 10, the NSI already instantiated $i^* \in \mathcal{B}$ which shares the largest number of network functions VNFs with the network service awaiting instantiation n is selected:

$$i^* = \operatorname*{argmax}_{i \in \mathcal{B}} \Lambda_{i,n}.$$

After temporarily adding n to the list of services associated with NSI $i^* \in \mathcal{B}$, for each pair of services n, n' belonging to $R_{i^*,k}$ where $R_{i^*,k}$ represents the set of services included in the NSI $i^*$ which require the network function $NF_k \in \mathcal{D}_n$, in step 12, the similarity between the configuration parameters of the two services $\mathcal{L}_{n,k}$ and $\mathcal{L}_{n',k}$ is defined as follows:

$$C(\mathcal{L}_{n,k}, \mathcal{L}_{n',k}) = \sum_{j=1}^{J} h(l_{n,k,j}, l_{n',k,j}),$$

where J is the number of parameters of the network function $NF_k$.

In step 14, the resources needed to be able to instantiate the service n through the selected NSI i* are determined, and in step 16 it is evaluated whether the resource request associated with this new service n can be accepted.

If there is no $i \in \mathcal{B}$ such that $\Lambda_{i,n} > 0$, i.e. if none of the NSIs of $\mathcal{B}$ shares network functions with the network service awaiting instantiation n, in step 18, a new NSI is defined and its request for resources is calculated, and then the admission control process is started to determine whether the service can be instantiated (step 16).

Figure 7:
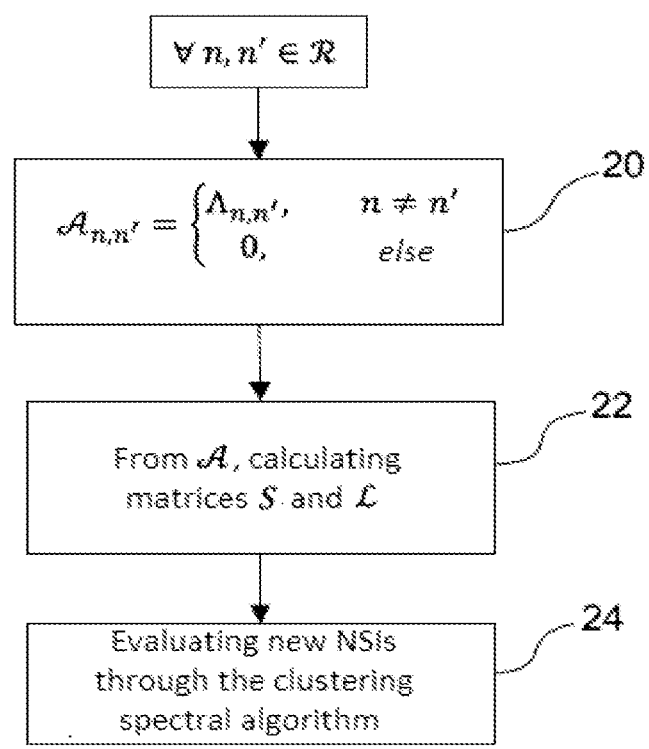
FIG. 7 represents a second flowchart illustrating steps in a particular embodiment of the invention.

In one particular embodiment of the invention illustrated in FIG. 7, the services previously instantiated in the set of NSIs are periodically re-classified via a normalized spectral classification algorithm, the services being represented as nodes of a connected graph and clusters are found by partitioning this graph according to their spectral decomposition into sub-graphs.

To this end, the set $\mathcal{R} = \{1, N_R\}$ of services already instantiated with requests NF $\{\lambda_1, \ldots, \lambda_{N_R}\}$ is defined and in step 20, an affinity matrix $\mathcal{A}$, the element $\mathcal{A}_{n,n'}$ of which is the Jaccard similarity between two services n,n'$\in \mathcal{R}$ already instantiated, is periodically calculated as follows:

$$\mathcal{A}_{n,n'} = \begin{cases} \Lambda_{n,n'}, & n \neq n' \\ 0, & \text{else} \end{cases},$$

where $\Lambda_{n,n'}$ is calculated by $$\Lambda_{i,n} = \frac{\lambda_n \lambda_i}{\|\lambda_n\| + \|\lambda_i\| - \lambda_n \lambda_i}, i \in \mathcal{B}.$$

Then in step 22, from $\mathcal{A}$ are deduced the corresponding diagonal matrix S the element (n, n) of which is the sum of the n-th row of A, $s_{n,n} = \Sigma_{n' \in \mathcal{R} \setminus n} \Lambda_{n,n'}$ and the associated normalized Laplacian matrix as:

$$\mathcal{L} = S^{-\frac{1}{2}} \mathcal{A} S^{-\frac{1}{2}},$$

Then, in step 24, the normalized eigenvectors of $\mathcal{K}$ are calculated and the first k eigenvectors are gathered using K-means, the number of clusters k is obtained such that all the eigenvalues (1, ..., k) are very small, but the (k+1)-th one is relatively large. Other similarity calculation techniques can be alternatively used as described in the papers entitled "Content caching clustering based on piecewise interest similarity," in Proc. IEEE GLOBECOM, December 2017, pp. 1-6 and "Cache-aided coded multicast for correlated sources," in Proc. of 9th International Symposium on Turbo Codes and Iterative Information Processing (ISTC), September 2016, pp. 360-364.

Preferably, requests for the instantiation of new network services are ordered according to their waiting time in a queue, and then, based on the oldest one, the NSI capable of instantiating this service and the associated quantity of network resources are determined, and then requests that can be fulfilled according to their request for resources are admitted.

In addition, requests for instantiation of new network services are ranked in relation to the average quantity of resources requested, and then checked to see which requests can be met, starting with the request characterized by the lowest request for network resources.

In one first alternative implementation, in the admission control step for accepting or rejecting requests for instantiation of new services, requests are classified into M classes, each characterized by a gain related to the instantiation acceptance $r_m$ and an instantiation rejection cost $I_m$, m E M. In addition, each network service request is stored in a queue with a size $Q_m$ dedicated to its class. A new service request is deleted when the corresponding queue is full. The management and orchestration systems perceive a gain related to instantiation acceptance $r_n$, when a request for a slice of the class m is accepted and an instantiation refusal cost $I_m$ when the request is deleted from its queue. Therefore, at time t, the action $a_m(t)$ of the admission controller can be evaluated through a reward function as follows:

$$R(t) = \sum_{m \in M} a_m(t) r_m - d_m(t) l_m,$$

where $d_m(t)$ indicates the number of requests for service of the class m abandoned at time t, which can be calculated as follows:

$$d_m(t) = \max\{s_m(t) - a_m(t) + n_m(t) - Q_m, 0\},$$

where $s_m(t)$ and $n_m(t)$ indicate respectively the number of requests for slice of the mth class in the queue and the additional slice requests received at time t.

A first solution is to maximize R (t) at each time interval t.

A second approach is to maximize a long-term reward function as follows:

$$\overline{R} = \sum_{t=0}^{\infty} \gamma^t R(t)$$

where $0 < \gamma < 1$ is a parameter called a reduction factor, which determines the importance of actions at each time interval on the long-term evaluation function.

Reinforcement learning can be used to optimize the function $\overline{R} = \sum_{t=0}^{\infty} \gamma^t R(t)$. There are many algorithms available for this purpose, such as Q-learning.

In a second alternative of the admission control step for accepting or rejecting requests for instantiation of new services, as in the first alternative, service requests are classified into M classes, each characterized by a gain related to the instantiation acceptance $r_m$ and potentially an instantiation refusal cost $I_m$, m∈M. Then, a controller momentarily reduces the quantity of resources for some of the services already instantiated, to potentially increase the number of services that can be accepted at a given slot. For example, the controller reduces the resources allocated to lower priority services in order to instantiate higher priority services. This limits the number of abandoned requests for low priority services. As a result, a smart controller can maximize a reward that takes into account the cost of reducing the resources allocated to services instantiated with low priority. In this case, the action $a_m(t)$ of the admission controller can be evaluated as follows:

$$R(t) = \sum_{m \in M} a_m(t) r_m - d_m(t) l_m - n_{cc,m}(t) l_{cc,m}$$

where $n_{cc,m}(t)$ is the quantity of resources reduced to the service m∈M and $I_{cc,m}$ is the cost associated with this action. As in the previous embodiment, it is possible to simply maximize R(t) at each time slice. On the other hand, reinforcement learning algorithms could be used to optimize the long-term instantiation acceptance $\overline{R}$.

The invention claimed is:

1. A method of optimizing the quantity of network resources and the number of services likely to use said resources in a virtualized telecommunications network characterized by the following steps of:
   evaluating the similarities between the services likely to use said resources in terms of the virtual network functions (VNF) required for the instantiation of each service,
   gathering services into network slices according to their similarities in order to maximize resource sharing,
   calculating additional resources to accept services awaiting instantiation, and,
   running an admission control scheme to accept or reject requests for the instantiation of new services.

2. The method according to claim 1, wherein each service is instantiated in a logic network slice (NSI) comprising at least two sets of virtual network functions, namely a set of network functions $K^R$ which correspond to a radio access network RAN and a set of network functions $K^C$ which correspond to a core network.

3. The method according to claim 2 further comprising the steps of:
   defining a set $\mathcal{K} = \mathcal{K}^R \cup \mathcal{K}^C = \{NF_1, \ldots, NF_K\}$ representing the set of network functions $K = (K_R + K_C)$ likely to be instantiated in the telecommunications network, and,
   for a given logic service n awaiting instantiation, defining a list $D_n$ containing the network functions required for the instantiation of this service and a description of the interactions between said network functions and parameters describing their respective configurations,
   defining a set of instantiated network slices comprising network functions shared between at least two network services and network functions specifically dedicated to a network service,
   comparing the network functions required by the network service awaiting instantiation with those of the set of NSIs likely to serve the service awaiting instantiation with a minimum of additional network resources,
   evaluating the similarities between the network functions being compared, and,
   based on the similarities evaluated, selecting the NSI that shares the greatest number of network functions with the service awaiting instantiation,
   if no NSI shares network functions with the service awaiting instantiation, creating a new NSI, consisting exclusively of network functions specifically dedicated to the service awaiting instantiation.

4. The method according to claim 3, wherein, for each service awaiting instantiation, n∈$\mathcal{N}$ ={0, 1, . . . , N}, N representing an integer N≥0, is defined a subset $D_n$ of the set $\mathcal{K} = \mathcal{K}^R \cup \mathcal{K}^C = \{NF_1, \ldots, NF_K\}$ containing the network functions required for its instantiation and a set of configuration parameters $\mathcal{L}_{n,k}$ for each network function, and, to indicate the network functions that make up the n-th request $D_n$, is defined (4) the vector $\lambda_n \in \{0,1\}^K$, the k-th input of which is defined by:

$$\lambda_{n,k} = \begin{cases} 1, \text{ if } NF_k \in \mathcal{D}_n \\ 0, \text{ else} \end{cases}, \forall NF_k \in \mathcal{K}.$$

then, for each network function $NF_k$ belonging to $D_n$, the associated configuration parameters are represented as a set of J binary vectors as follows:

$$\mathcal{L}_{n,k} = \{l_{n,k,1}, l_{n,k,2}, \ldots, l_{n,k,J}\},$$

then the configuration parameters are mapped with a parameter $d_{n,k,r}$ representing the quantity of communication resources, a parameter $d_{n,k,c}$ representing the computing resources of the calculation, and a parameter $d_{n,k,m}$ representing the cloud storage capacity required by the network function $NF_k$ of the n-th service instantiation request using a template consisting of a static and a dynamic part:

$$d_{n,k,r} = \rho_k + f_{k,r}(\mathcal{L}_{n,k}),$$

$$d_{n,k,c} = \chi_k + f_{k,c}(\mathcal{L}_{n,k}),$$

$$d_{n,k,m} + \mu_k + f_{k,m}(\mathcal{L}_{n,k}),$$

where $\rho_k$, $\chi_k$ and $\mu_k$ represent the minimum quantity of resources required to activate a given network function $NF_k \in D_n$, and $f_{k,m}(\mathcal{L}_{n,k})$, $f_{k,c}(\mathcal{L}_{n,k})$, and $f_{km}(\mathcal{L}_{n,k})$ representing the additional quantity of resources required, which depends on the configuration parameters, $\mathcal{L}_{n,k}$ of the network function $NF_k$, and the total request for communication resources, computing resources and cloud storage resources for said n-th request is calculated by the following formula:

$$T_n = (d_{n,r}, d_{n,c}, d_{n,m}),$$

where $d_{n,r} = \Sigma_{NF_k \in \mathcal{D}_n} d_{n,k,r}$, $d_{n,c} = \Sigma_{NF_k \in \mathcal{D}_n} d_{n,k,c}$ and $d_{n,m} = \Sigma_{NF_k \in \mathcal{D}_n} d_{n,k,m}$.

5. The method according to claim 4, wherein evaluating the similarities between the network functions required by a network slice awaiting instantiation and those of the set of NSIs $\mathcal{B}$ already instantiated is obtained by calculating a Jaccard similarity parameter by the following formula:

$$\Lambda_{i,n} = \frac{\lambda_n \lambda_i}{\|\lambda_n\| + \|\lambda_i\| - \lambda_n \lambda_i}, i \in \mathcal{B},$$

where $\lambda_i$ indicates the network functions that make up the NSI $i \in \mathcal{B}$ already instantiated, and $\|\cdot\|$ representing a Euclidean norm operator.

6. The method according to claim 5, wherein, if none of the NSIs already instantiated is adapted to the service awaiting instantiation, a new NSI is defined.

7. The method according to claim 5, wherein, on the basis of the similarities calculated, is selected the already instantiated NSI $i^* \in \mathcal{B}$ which shares the largest number of network functions VNFs with the network service awaiting instantiation n:

$$i^* = \underset{\in \mathcal{B}}{\operatorname{argmax}} \Lambda_{i,n}.$$

then, n is temporarily added to the list of services related to NSI $i^*$.

8. The method according to claim 7, wherein, for each pair of network services n, n' $\in R_{i^*,k}$, where $R_{i^*,k}$ represents the set of services included in the NSI $i^* \in \mathcal{B}$ which require the network function $NF_k \in \mathcal{D}_n$, the similarity between a first set of configuration parameters $\mathcal{L}_{n,k}$ and a second set of configuration parameters $\mathcal{L}_{n',k}$ is defined as follows:

$$C(\mathcal{L}_{n,k}, \mathcal{L}_{n',k}) = \sum_{j=1}^{J} h(l_{n,k,j}, l_{n',k,j}),$$

where J is the number of parameters of the network function $NF_k$ and $h(\bullet)$ is the cosine similarity function (or cosine metric) which allows calculation of the similarity between two N-dimensional vectors by determining the cosine of the angle between them:

$$h(l_{n,k,j}, l_{n',k,j}) = \frac{l_{n,k,j} l_{n',k,j}}{\|l_{n,k,j}\| \|l_{n',k,j}\|}.$$

9. The method according to claim 8, wherein for each network function $NF_k \in \mathcal{D}_n$, of the service n, the quantity of resources that can be pooled between the different network services instantiated in the NSI $i^*$ and the new service n through the parameter $\sigma^*_{n,k,j}$ are evaluated as follows:

$$\sigma^*_{n,k,j} = \max_{n' \neq n \in \mathcal{R}_{i,k}} C(\mathcal{L}_{n,k}, \mathcal{L}_{n',k}), i \in \mathcal{B},$$

where the index j represents either communication resources, computing resources or storage resources.

10. The method according to claim 9, wherein the resources required to instantiate each function of the service n are calculated via the NSI $i^*$ using a template consisting of a static and a dynamic part:

$$d'_{n,k,r} = \rho_k \beta(\sigma^*_{n,k,j}) + (1-\sigma^*_{n,k,j}) f_{k,r}(\mathcal{L}_{n,k}),$$

$$d'_{n,k,c} = \chi_k \beta(\sigma^*_{n,k,j}) + (1-\sigma^*_{n,k,j}) f_{k,c}(\mathcal{L}_{n,k}),$$

$$d'_{n,k,m} = \mu_k \beta(\sigma^*_{n,k,j}) + (1-\sigma^*_{n,k,j}) f_{k,m}(\mathcal{L}_{n,k}),$$

where $\beta(x)$ is the characteristic function, which is equal to 1 if $x=0$ and is equal to 0 if $x \neq 0$ and, the total request for communication resources, computing resources and cloud storage resources for said n-th service instantiation request is calculated as follows:

$$T'_n = (d'_{n,r}, d'_{n,c}, d'_{n,m}),$$

where $d'_{n,r} = \Sigma_{NF_k \in \mathcal{D}_n} d'_{n,k,r}$, $d'_{n,c} = \Sigma_{NF_k \in \mathcal{D}_n} d'_{n,k,c}$ and $d'_{n,m} = \Sigma_{NF_k \in \mathcal{D}_n} d'_{n,k,m}$.

11. The method according to claim 3, wherein the services previously instantiated in the set of NSIs $\mathcal{B}$ are periodically re-classified, via a normalized spectral classification algorithm, the services being represented as nodes of a connected graph and clusters are found by partitioning this graph according to their spectral decomposition into subgraphs.

12. The method according to claim 11, wherein the set $R = \{1, N_R\}$ of the services already instantiated is defined with requests $NF\{\lambda 1, \ldots, \lambda_{N_R}\}$ and an affinity matrix $\mathcal{A}$, the elements of which are the Jaccard similarity between two already instantiated services n,n'$\in \mathcal{R}$ is periodically calculated (20) as follows:

$$\mathcal{A}_{n,n'} = \begin{cases} \Lambda_{n,n'}, & n \neq n' \\ 0, & \text{else} \end{cases},$$

where $\Lambda_{n,n'}$ is calculated by $$\Lambda_{i,n} = \frac{\lambda_n \lambda_i}{\|\lambda_n\| + \|\lambda_i\| - \lambda_n \lambda_i}, i \in \mathcal{B},$$

then (22) is deduced from $\mathcal{A}$ the corresponding diagonal matrix $\mathcal{S}$ the element (n, n) of which is the sum of the n-th row of A, $s_{n,n} = \Sigma_{n' \in \mathcal{R} \setminus n} \Lambda_{n,n'}$, and the associated normalized Laplacian matrix as:

$$\mathcal{L} = \mathcal{S}^{-\frac{1}{2}} \mathcal{A} \mathcal{S}^{-\frac{1}{2}},$$

And then, the normalized eigenvectors of $\mathcal{L}$ are calculated and the first k eigenvectors are gathered using K-means, the number of clusters k is obtained such that all the eigenvalues (1, . . . , k) are very small, but the (k+1)-th is relatively large.

13. The method according to claim 10, wherein requests for the instantiation of new network services are ordered as a function of:

their waiting time in a queue and then, from the oldest one, requests that can be fulfilled as a function of their request for resources are admitted; or the average quantity of resources requested, then which requests can be fulfilled are checked, starting from the request characterized by the smallest request for network resources.

* * * * *